US012604879B2

(12) United States Patent
Pell

(10) Patent No.: US 12,604,879 B2
(45) Date of Patent: Apr. 21, 2026

(54) BUG KILLING DEVICE

(71) Applicant: Concept 2 Consumer LLC, Peru, IL (US)

(72) Inventor: Matthew Pell, Peru, IL (US)

(73) Assignee: Concept 2 Consumer LLC, Peru, IL (US)

( * ) Notice: Subject to any disclaimer, the term of this patent is extended or adjusted under 35 U.S.C. 154(b) by 0 days.

(21) Appl. No.: 18/917,621

(22) Filed: Oct. 16, 2024

(65) Prior Publication Data

US 2025/0134087 A1     May 1, 2025

Related U.S. Application Data

(60) Provisional application No. 63/546,155, filed on Oct. 27, 2023.

(51) Int. Cl.
| | |
|---|---|
| *A01M 3/00* | (2006.01) |
| *F41B 5/14* | (2006.01) |
| *F41B 11/52* | (2013.01) |
| *F41B 11/641* | (2013.01) |
| *F41B 11/80* | (2013.01) |

(52) U.S. Cl.
CPC ............. *A01M 3/00* (2013.01); *F41B 5/1403* (2013.01); *F41B 11/52* (2013.01); *F41B 11/641* (2013.01); *F41B 11/80* (2013.01)

(58) Field of Classification Search
CPC ........ F41B 5/1403; F41B 11/52; F41B 11/62; F41B 11/641; F41B 11/80; A01M 3/00
See application file for complete search history.

(56) References Cited

U.S. PATENT DOCUMENTS

| | | | | |
|---|---|---|---|---|
| 2,214,224 A | * | 9/1940 | Douglas | F41B 11/52 124/67 |
| 2006/0070609 A1 | * | 4/2006 | Smith | F41B 5/10 124/25.6 |
| 2010/0024791 A1 | * | 2/2010 | Romney | F41B 5/14 124/56 |
| 2011/0220088 A1 | * | 9/2011 | Maggiore | F41B 11/68 124/40 |

* cited by examiner

*Primary Examiner* — Bret Hayes
(74) *Attorney, Agent, or Firm* — Justin Lampel

(57) ABSTRACT

A bug killing bow is provided. The bug killing bow may take the form of an archery bow. The archery bow has a chamber which stores a material such as, for example small particulate material such as salt. The small particulate material may be expelled from a barrel of the bow by air. When the bow is aimed at an insect and the small particulate material is expelled, the small particulate material may be used to kill the insect.

10 Claims, 4 Drawing Sheets

BUG KILLING DEVICE

CROSS REFERENCE TO RELATED APPLICATIONS

The following application is a based on and claims the priority benefit of U.S. provisional application Ser. No. 63/546,155 filed Oct. 27, 2023; the entire content of which is incorporated by reference.

BACKGROUND OF THE INVENTION

A bug killing bow is provided. The bug killing bow may take the form of an archery bow. The archery bow has a chamber which stores a material such as, for example small particulate material such as salt. The small particulate material may be expelled from a barrel of the bow by air. When the bow is aimed at an insect and the small particulate material is expelled, the small particulate material may be used to kill the insect.

Devices for killing bugs is known. For example, U.S. Pat. No. 9,939,227 to Maggiore discloses a bug killing gun having a compressed gas source fluidly connected to a chamber connected to a barrel. A compressed gas release mechanism is connected to the compressed gas source. A projectile storage magazine stores particulate projectiles and is located adjacent the chamber. A projectile loading mechanism moves the projectiles into the chamber from the magazine. A cocking mechanism is mechanically connected to the compressed gas source, the compressed gas release mechanism, and the projectile loading mechanism. When the gun is cocked, the projectile loading mechanism loads a quantity of the particulate projectiles into the chamber. When the compressed gas release mechanism is activated the projectiles are ejected from the chamber into the barrel and expelled from the gun. The gun optionally includes a laser sighting mechanism. The battery-operated laser sighting mechanism may be removably attached to the barrel or permanently attached with an integral, trigger operated switch.

Further, U.S. Pat. No. 9,664,475 to Maggiore discloses a prepackaged bug gun magazine for a gas powered weapon includes a body adapted to fit within an opening in the weapon. The magazine has a first surface, a second surface and at least one chamber. The length of the chambers extends from the first surface to the second surface. A first frangible sealing membrane is removably affixed to the first surface of the body and seals the first end of the chamber. A second frangible sealing membrane is removably affixed to the second surface of the body and seals the second end of the chamber. Particulate projectiles are located within the chambers and sealed in place by the sealing membranes. An indexing system aligns the chamber with a barrel of the weapon. Discharge causes pressurized gas to breach the first membrane and impact of the particulate projectiles will breach the second membrane, permitting the projectiles to enter the barrel.

However, these patent documents fail to describe a bug killing bow which is easy to use. Further, these patents fail to provide for a bug killing bow which allows user to safely and quickly kill an insect.

SUMMARY OF THE INVENTION

A bug killing bow is provided. The bug killing bow may take the form of an archery bow. The archery bow has a chamber which stores a material such as, for example small particulate material such as salt. The small particulate material may be expelled from a barrel of the bow by air. When the bow is aimed at an insect and the small particulate material is expelled, the small particulate material may be used to kill the insect.

An advantage of the present bug killing bow is that the present bug killing bow is effective.

Another advantage of the present bug killing bow is that the present bow is easy to use.

Still another advantage of the present bug killing bow is that the present bow is durable.

Yet another advantage of the present bug killing bow is that the present bow is lightweight.

For a more complete understanding of the above listed features and advantages of the bug killing bow reference should be made to the detailed description and the drawings. Further, additional features and advantages of the invention are described in, and will be apparent from, the detailed description of the preferred embodiments.

DETAILED DESCRIPTION OF THE PREFERRED EMBODIMENTS

Figure 1:
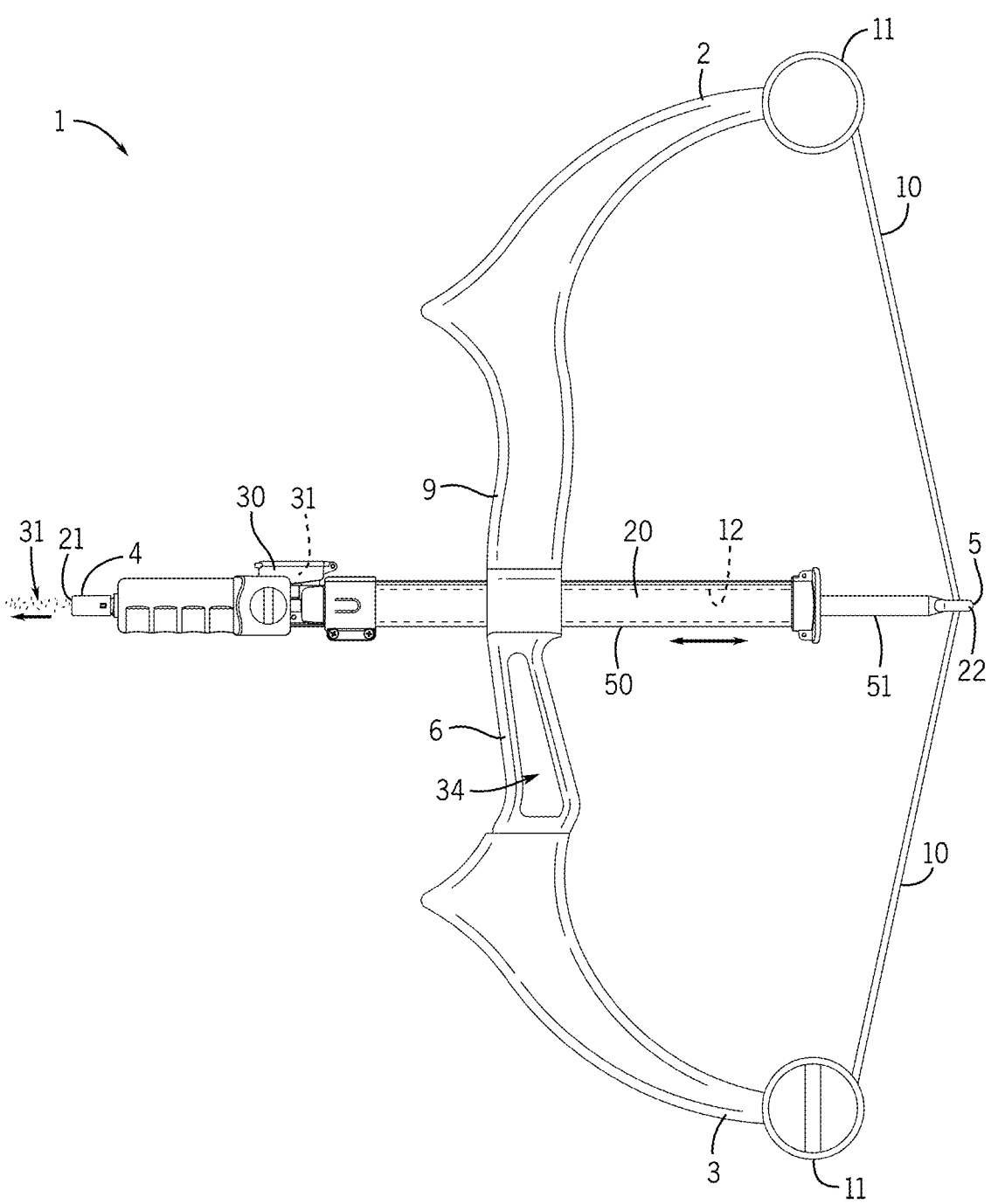
FIG. 1 illustrates a side view of the archery bow in one embodiment.
Figure 2:
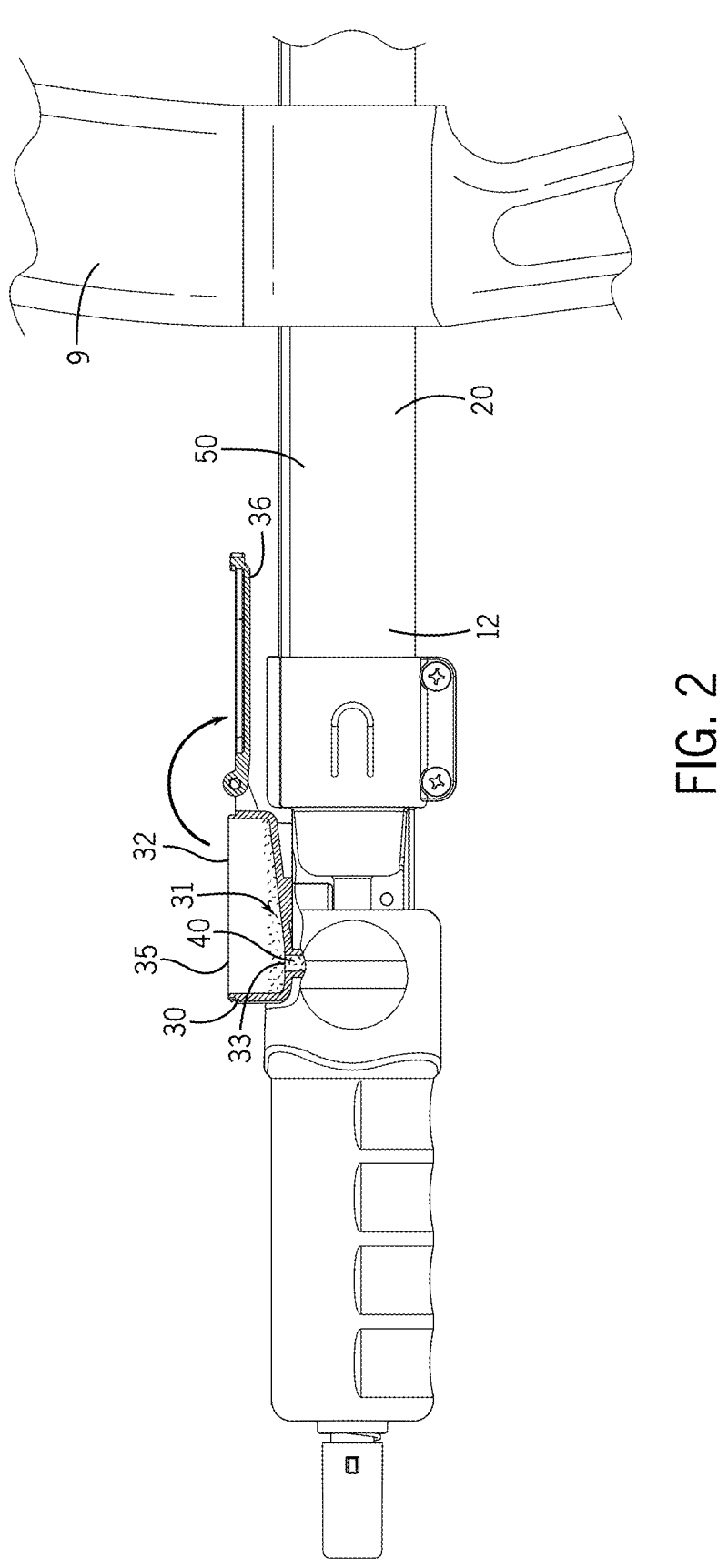
FIG. 2 illustrates a detailed view of the hopper of the bow in one embodiment.

A bug killing bow is provided. The bug killing bow may take the form of an archery bow. The archery bow has a chamber which stores a material such as, for example small particulate material such as salt. The small particulate material may be expelled from a barrel of the bow by air. When the bow is aimed at an insect and the small particulate material is expelled, the small particulate material may be used to kill the insect.

In an embodiment, a bow 1 is provided. The bow 1 may have a top 2, a bottom 3, a front 4, a back 5, a first side 6, a second side (not visible in the drawings) and a main riser 9. A cable 10 may connect the top 2 of the bow 1 to the bottom 3 of the bow 1. Located at the top 2 and the bottom 3 of the bow 1 may be an adjustable tensioner 11. The cable 10 may be in contact with the tensioner 11 and may create tension when pulled back. The bow 1 may be constructed from materials selected from plastic, metal, composite materials, or other suitable lightweight and durable materials.

The bow 1 may further have a barrel 20 having a front 21 and a back 22. The barrel 20 may be generally perpendicular with respect to the riser 9. In an embodiment, the barrel 20 may have a generally hollow interior 12. The bow 1 may have a handle portion 34 to allow a user to easily grip the bow 1. The handle portion 34 may be located on the riser 9.

A hopper 30 may be connected to the barrel 20. The hopper 30 may store the small particulate material (also referred to as "propellent" or "projectile") 31 such as, for example, small particulate material 31 such as salt. In an embodiment, the hopper 30 may have a top 32 and a bottom 33. The top 32 of the hopper 30 may have an opening 35 in which the small particulate material 31 may be added into the hopper 30. A lid 36 (shown in the open position in FIG.

2) may be located at the top 32 of the hopper 30 to keep the small particulate material 31 within the hopper 30.

An opening 40 is located at the bottom 33 of the hopper 30. The opening 40 at the bottom 33 of the hopper 30 may allow the small particulate material 31 to pass from the hopper 30 into the barrel 20. Once in the barrel 20, the small particulate material 31 may be shot out the front 21 of the barrel 20 as described below.

In an embodiment, the barrel 20 may have a first tube 50 and a second tube 51. The second tube 51 may be located at the back 22 of the barrel 20 while the first tube 50 is located at the front 21 of the barrel 20. The first tube 50 and the second tube 51 may be telescoping related. More specifically, the second tube 51 may move in a telescoping manner with respect to the stationary first tube 50 (which is attached to the riser 9). In an embodiment, the middle portion of the cable 10 may be attached to the second tube 51. As a user pulls the cable 10 back away from the riser 9, the air within the interior 12 of the barrel 20 decreases in pressure. When the cable 10 is released, the second tube 51 is rapidly pushed forward by the spring tension of the cable 10 therein creating a burst of air within the interior 12 of the barrel 20. The air 20 then forces the small particulate material 31 out of the front 21 of the barrel 20. The farther the cable 10 is pulled, the more force the small particulate material 31 will have when it leaves the bow 1.

As the small particulate material 31 leaves the barrel 20, it travels with enough force to kill insects. Preferably, the hopper 30 and the barrel 20 may both be removed from the bow 1 for repair or may be removed from the bow 1 to allow the user to select an alternative hopper 30 and or barrel 20 having a different function or capability. In an alternative embodiment, the bow 1 may have a source of compressed gas which propels the small particulate material 31 as opposed to the user creating the compressed gas by pulling the cable 10 back and releasing it.

In an embodiment, the hopper 30 is located at the front 21 of the barrel 20, on the side of the riser 9 opposite the cable 10. As a result, the small particulate material 31 leaves the bow 1 at a greater speed. Further, the hopper 30 may be permanently secured to the barrel 20 and not the riser 9 so that the hopper 30 may be easily replaced.

Figure 3:
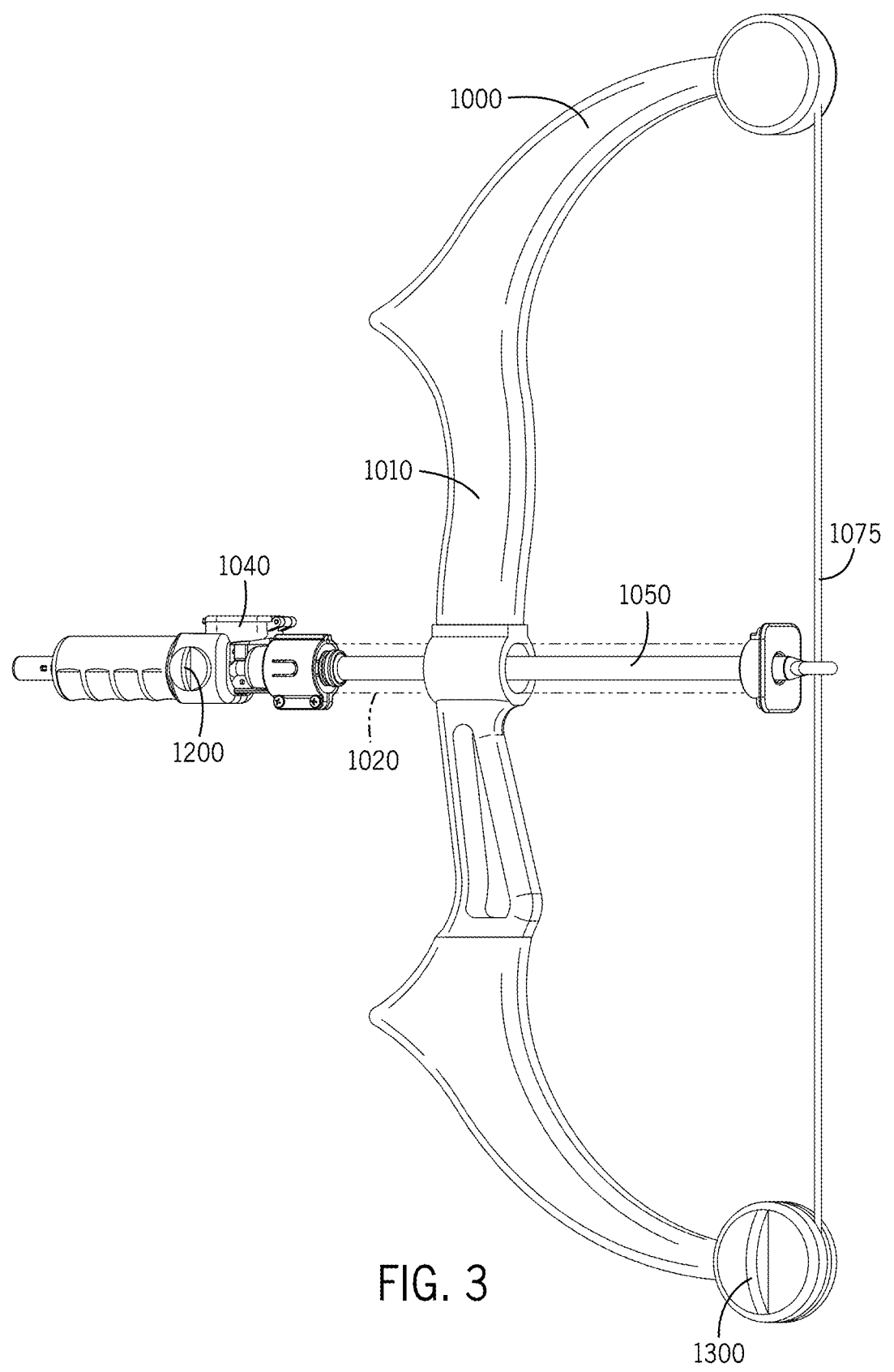
FIG. 3 illustrates an alternative embodiment of the bug killing bow.
Figure 4:
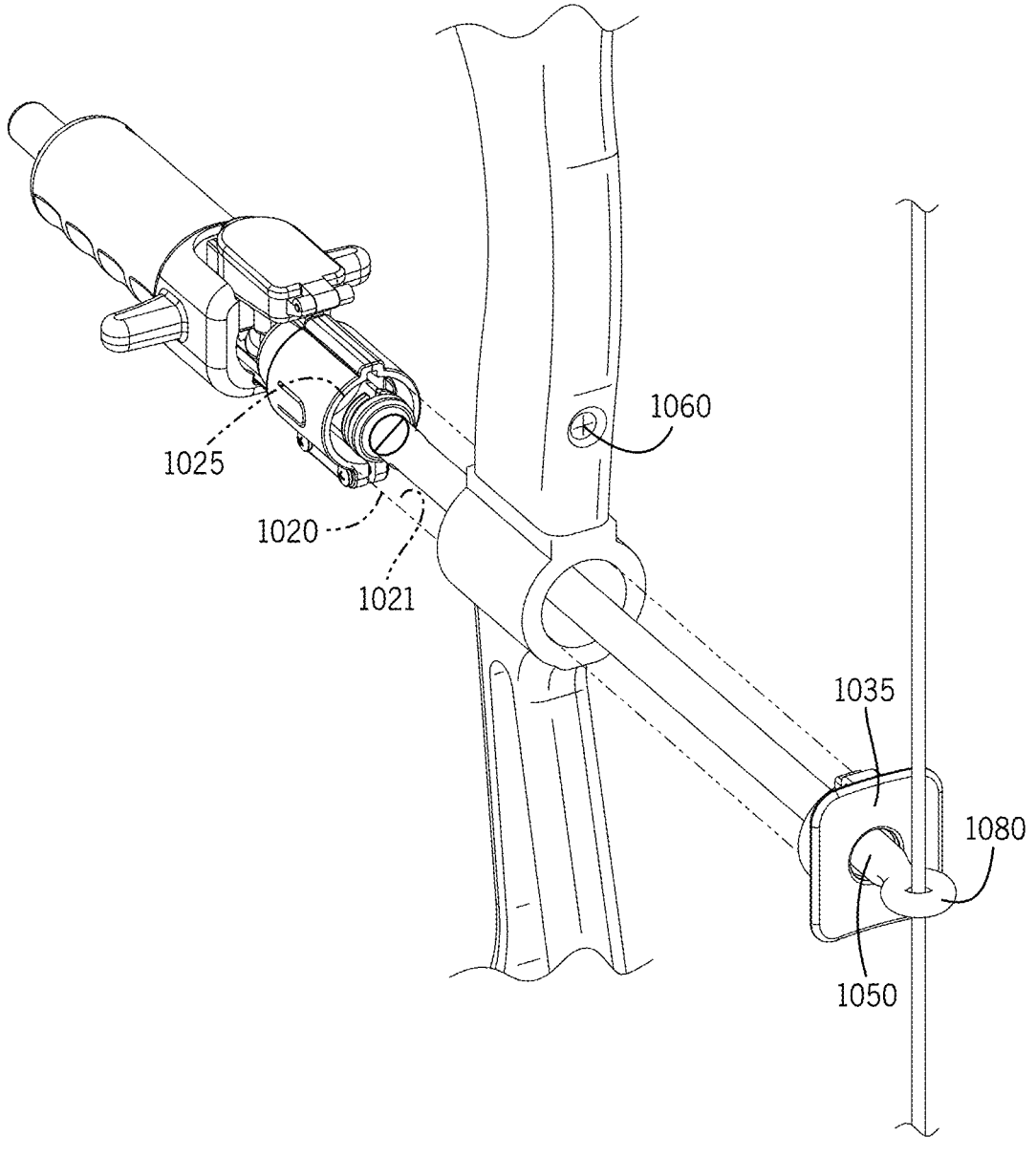
FIG. 4 illustrates a back perspective view of the alternative bug killing bow of FIG. 3.

Referring now to FIGS. 3 and 4, an alternative embodiment of a bug killing bow 1000 is shown. In this embodiment, the bug killing bow 1000 may have a barrel 1020 having an interior 1021. The barrel 1020 may further have a front 1025 and a back 1035. A plunger 1050 may be located within the interior 1021 of the barrel 1020. The plunger 1050 may telescopingly expand and contract so as to allow a user to pull the plunger 1050 back farther, away from a riser 1010 of the bow 1000. As a result of the plunger 1050 being able to be pulled back farther away from the riser 1010, an increase in air pressure within the interior 1021 of the barrel 1020 is created, therein resulting in greater exit velocity of the small particulate material 31. In an embodiment the plunger 1050 has a secured loop 1080 in which the cable 1075 passes through. As a result, the cable 1075 never becomes dislodged from the plunger 1050.

In one embodiment, a sight (or alignment hole) 1060 may be located on, for example, the riser 1010 which allows a user to properly align and aim the bow 1000. In particular, a user may align his/her eye with the sight 1060 so as to see directly through the riser 1010 at the target insect. As a result, a user may easily aim the bow 1 by looking into the sight 1060.

In an embodiment, a safety control mechanism (or "dial") 1200 may be located on the bow 1000. The safety control mechanism 1200 is preferably located at or around a hopper 1040 of the bow 1000. The safety control mechanism 1200 may be turned clockwise or counter-clockwise in order to release the small particulate material 31 into the barrel 1020 of the bow 1000 just prior to firing the bow 1000. More specifically, a user first turns the safety control mechanism 1200 to release the small particulate material 31 and then, in a second step, pulls a cable 1075 back which is attached to the plunger 1050 prior to firing the bow 1000. As a result, two steps are needed. The additional step increases the safety of the bow 1000. Further, the safety control mechanism 1200 may allow a user to determine the specific amount of small particulate material 31 which is loaded into the interior 1021 of the barrel 1020 for firing. The safety control mechanism 1200 may also be a safety mechanism which prevents the accidental discharge of the small particulate material 31.

In an embodiment, a first and a second dial 1300 may be located on tensioner 11. The dial 1300 may allow a user to easily and safely adjust the tension of the cable 1075. As a result, a user is better able to control the velocity of the small particulate material 31.

Although embodiments of the invention are shown and described therein, it should be understood that various changes and modifications to the presently preferred embodiments will be apparent to those skilled in the art. Such changes and modifications may be made without departing from the spirit and scope of the invention and without diminishing its attendant advantages.

I claim:

1. A bug killing bow comprising:
   a bow having a handle and a riser;
   a barrel attached to the riser of the bow;
   a hopper wherein the hopper is attached to the barrel and wherein a particulate is stored in the hopper;
   a cable configured to interact with the barrel to create a projectile force;
   wherein the barrel has a first tube having an interior and a second tube, wherein the second tube of the barrel telescopically interacts with the interior of the first tube of the barrel to adjust the length of the barrel;
   wherein the hopper is located at the front of the first tube of the barrel on the opposite side of the riser as the cable;
   a source of compressed gas or air generated by a movement of the cable, wherein the compressed gas or air is released to expel the particulate from the barrel when the cable is drawn and released.

2. The bug killing bow of claim 1, wherein the particulate stored in the hopper are selected from the group comprising salt, powdered particles, small solid projectiles, or any other non-toxic particulate matter suitable for insect elimination.

3. The bug killing bow of claim 1, further comprising:
   a lid on the hopper to seal the particulate within the hopper when not in use.

4. The bug killing bow of claim 1, wherein the compressed gas or air source is generated by the movement of the cable interacting with a plunger or telescoping tube inside the barrel, creating airflow to expel the particulate.

5. The bug killing bow of claim 1, further comprising:
   an adjustable tensioner located on the bow, wherein the tensioner adjusts the tension in the cable for varying the force of the expelling the particulate.

6. The bug killing bow of claim 1, further comprising:
   a safety control mechanism, wherein the safety mechanism controls the release of the particulate and prevent accidental discharge.

7. The bug killing bow of claim 1, further comprising:

a sight or alignment hole, located on the bow or barrel to assist in targeting insects.

8. The bug killing bow of claim 1, wherein the handle, barrel, and hopper are constructed from materials selected from plastic, metal, composite materials, or other suitable lightweight and durable materials.

9. The bug killing bow of claim 1, further comprising modular and replaceable components, wherein the hopper, barrel, or other connected elements are designed to be interchangeable for different types of propellants or components.

10. The bug killing bow of claim 1 further comprising:

a secured loop wherein the secured loop is attached to the second tube of the barrel and wherein the cable passes through the secured loop and wherein the secured loop prevents the cable from becoming dislocated from the second tube of the barrel.

\* \* \* \* \*